United States Patent
Kushnir et al.

(10) Patent No.: US 9,424,121 B2
(45) Date of Patent: Aug. 23, 2016

(54) ROOT CAUSE ANALYSIS FOR SERVICE DEGRADATION IN COMPUTER NETWORKS

(71) Applicant: Alcatel-Lucent USA, Inc., Murray Hill, NJ (US)

(72) Inventors: Dan Kushnir, Springfield, NJ (US); Ahmet Akyamac, Bridgewater, NJ (US); Veena Mendiratta, Oak Brook, IL (US); Huseyin Uzunalioglu, Millington, NJ (US); Derek Doran, Beavercreek, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 78 days.

(21) Appl. No.: 14/563,621

(22) Filed: Dec. 8, 2014

(65) Prior Publication Data

US 2016/0162346 A1    Jun. 9, 2016

(51) Int. Cl.
G06F 11/00 (2006.01)
G06F 11/07 (2006.01)

(52) U.S. Cl.
CPC .......... *G06F 11/079* (2013.01); *G06F 11/0796* (2013.01)

(58) Field of Classification Search
CPC .................................. G06F 11/0796
USPC ............................ 714/47.1, 47.2, 47.3, 4.1, 1
See application file for complete search history.

(56) References Cited

U.S. PATENT DOCUMENTS

| | | | |
|---|---|---|---|
| 8,156,378 B1* | 4/2012 | Suit ...................... | G06F 11/0709 714/26 |
| 8,204,980 B1* | 6/2012 | Sandstrom .......... | G06F 11/0727 709/224 |
| 2004/0049565 A1* | 3/2004 | Keller .................. | G06F 11/079 709/223 |
| 2005/0240943 A1* | 10/2005 | Smith ..................... | G06F 9/465 709/328 |
| 2009/0183029 A1* | 7/2009 | Bethke ................ | G06F 11/0709 714/26 |
| 2009/0183030 A1* | 7/2009 | Bethke ................ | G06F 11/0709 714/37 |
| 2013/0226318 A1* | 8/2013 | Procyk ................ | G05B 13/021 700/33 |

FOREIGN PATENT DOCUMENTS

| | | |
|---|---|---|
| WO | 2013148785 | 3/2013 |
| WO | 2013044974 | 4/2013 |
| WO | 2014040633 | 3/2014 |
| WO | 2014068348 | 3/2014 |

* cited by examiner

*Primary Examiner* — Dieu-Minh Le
(74) *Attorney, Agent, or Firm* — Kramer & Amado, P.C.

(57) ABSTRACT

Various exemplary embodiments relate to a method of determining the root cause of service degradation in a network, the method including determining a window of time; determining one or more abnormal Key Quality Indicators (KQIs) in the window; determining one or more abnormal Key Performance Indicators (KPIs) in the window; calculating a conditional probability that each of one or more KPIs is abnormal when a Key Quality Indicator (KQI) is normal; calculating a conditional probability that the each of one or more KPIs is abnormal when the KQI is abnormal; calculating a score for each KPI based upon a divergence of a Beta distribution for the conditional probability that each of one or more KPIs is abnormal when a KQI is normal and a Beta distribution for the conditional probability that the each of one or more KPIs is abnormal when the KQI is abnormal; and generating a representative root-cause list based upon the score for each KPI.

20 Claims, 4 Drawing Sheets

ROOT CAUSE ANALYSIS FOR SERVICE DEGRADATION IN COMPUTER NETWORKS

TECHNICAL FIELD

Various exemplary embodiments disclosed herein relate generally to determining the root causes of network service quality degradations.

BACKGROUND

When network failures occur, customers of network providers, such as users, service providers, or other consumers of network bandwidth may experience a service degradation where their level of service is diminished from a range where service is interrupted or merely not optimal.

SUMMARY

In light of the present need for swift identification of the root causes of service degradations, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of determining the root cause of service degradation in a network, the method including determining a window of time; determining one or more abnormal Key Quality Indicators (KQIs) in the window; determining one or more abnormal Key Performance Indicators (KPIs) in the window; calculating a conditional probability that each of one or more KPIs is abnormal when a Key Quality Indicator (KQI) is normal; calculating a conditional probability that the each of one or more KPIs is abnormal when the KQI is abnormal; calculating a score for each KPI based upon a divergence of a Beta distribution for the conditional probability that each of one or more KPIs is abnormal when a KQI is normal and a Beta distribution for the conditional probability that the each of one or more KPIs is abnormal when the KQI is abnormal; and generating a representative root-cause list based upon the score for each KPI. In some embodiments determining one or more abnormal KQIs in the window includes determining anomalous behavior of the KQI. In other embodiments determining one or more abnormal KQIs in the window includes determining network alarms of the KQI and determining network alarms of the KPI. Alternative embodiments further include generating two or more clusters of KQIs based on root cause scores of the KPIs of each KQI, wherein each cluster includes at least one KQI.

In some embodiments generating a representative root-cause list based upon the score for each KPI includes calculating a weighted average score of each KPI type in each cluster. In further embodiments generating a representative root-cause list based upon the score for each KPI includes ranking the scores for each of the one or more KPIs. Other embodiments further include determining the size of each cluster and prioritizing two or more root cause recovery actions based on the size of each cluster. In some embodiments generating a representative root-cause list based upon the score for each KPI includes ranking the scores for each of the one or more KPIs. Some embodiments further include modifying the rank of the scores for each of the one or more KPIs based upon a cost to repair each of the one or more KPIs. Other embodiments further include determining a KPI with the highest priority. In alternative embodiments determining a KPI with the highest priority includes determining the KPI with the highest rank, impact and lowest repair costs. In further embodiments determining a KPI with the highest priority further includes determining the size of each cluster of KQIs; and prioritizing two or more recovery actions based upon the number of KQIs determined in the size of each cluster of KQIs.

Various exemplary embodiments relate to an administrative device for determining the root cause of service degradation in a network, the device including a network interface configured to communicate with other devices in a network; a memory; and a processor in communication with the network interface and the memory, the processor configured to determine a window of time; determine one or more abnormal Key Quality Indicators (KQIs) in the window; determine one or more abnormal Key Performance Indicators (KPIs) in the window; calculate a conditional probability that each of one or more KPIs is abnormal when a Key Quality Indicator (KQI) is normal; calculate a conditional probability that the each of one or more KPIs is abnormal when the KQI is abnormal; calculate a score for each KPI based upon a divergence of a Beta distribution for the conditional probability that each of one or more KPIs is abnormal when a KQI is normal and a Beta distribution for the conditional probability that the each of one or more KPIs is abnormal when the KQI is abnormal; and generate a representative root-cause list based upon the score for each KPI. In other embodiments the processor is further configured to, when determining one or more abnormal KQIs in the window, determine anomalous behavior of the KQI. In some embodiments the processor is further configured to, when determining one or more abnormal KQIs in the window, determine network alarms of the KQI; and determine network alarms of the KPI.

In further embodiments the processor is further configured to generate two or more clusters of KQIs based on root cause scores of the KPIs of each KQI, wherein each cluster includes at least one KQI. In some embodiments the processor is further configured to, when generating a representative root-cause list based upon the score for each KPI, calculate a weighted average score of each KPI type in each cluster. In further embodiments the processor is further configured to, when generating a representative root-cause list based upon the score for each KPI, rank the scores for each of the one or more KPIs. In alternative embodiments the processor is further configured to determine the size of each cluster; and prioritize two or more root cause recovery actions based on the size of each cluster. In some embodiments the processor is further configured to, when generating a representative root-cause list based upon the score for each KPI, rank the scores for each of the one or more KPIs.

It should be apparent that, in this manner, various exemplary embodiments enable determination of the root cause of service degradations. In particular, by determining a correlation between service degradations and the performance of network components.

BRIEF DESCRIPTION OF THE DRAWINGS

In order to better understand various exemplary embodiments, reference is made to the accompanying drawings, wherein.

DETAILED DESCRIPTION

In view of the foregoing, it would be beneficial to quickly identify the root cause of service degradation so that the root cause of the degradation may be fixed as quickly as possible.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein. Further, while various exemplary embodiments are described with regard to computer networks, it will be understood that the techniques and arrangements described herein may be implemented to facilitate detection of component failure in other types of systems that implement multiple types of data processing or data structure.

Individual components of computer networks may fail outright or function at a level inadequate to bear the demands of the network. Although degradation of network service is most often caused by the failure or inadequacy of network components, when a service degradation occurs it is not necessarily obvious which component or components are the root cause of the degradation, much less what element or setting of any individual component or group of components is the cause of the problem. The efforts of service providers to remedy network problems require a determination of the root cause or root causes of each problem, as well as the extent of the impact of the problem in order to focus and prioritize repair efforts. Most existing methods of locating the cause of service degradation rely on domain knowledge and/or network and service topological information to identify the root causes of network problems. Because these methods rely on known network or component configurations or pre-set indications of network disruptions, for example, alarms, such approaches are limited to identifying only well studied, anticipated, or previously encountered degradation cases, and depend on human intervention and rule construction which may be inaccurate. Furthermore, collecting domain knowledge and topology information is non-trivial and may significantly add to the cost and complexity of network management systems.

Further, the few adaptable systems that may generate error indications without a proscribed alarm are limited to simplistic, one-factor determinations of network quality. For example, a system that detects potential problems in VoIP service measures the success of a call as a Bernouli (true/false) trial in a Kullback Leibler (KT) divergence analysis, but has no other indicators by which to determine network quality, meaning its applicability is limited to VoIP systems where call completion is a leading indicator of reliability, and can only examine whether a component was active or not, and if active, if a call went through. Moreover, the KL-based analysis mechanism is unstable in a variety of cases, leading to unusable or inconclusive results.

A root cause detection engine may assist service providers and pro-active care teams identify network elements that are behaving erroneously and causing degradation of network service. An automatic solution may not rely on human intervention, domain-knowledge, alarms, or prior knowledge of trouble scenarios to determine indications of network problems. A statistical model may be applied to historical benchmark data to accurately infer the causes of network problems. Such a model may not require complex operations such as mapping network topology and service dependencies, rather learning a statistical pattern of failures based upon a database of the network components' measurements. Because the model may be based upon observed and measured data rather than conditions known by network administrators, such a model is vendor and technology agnostic.

As described below, a framework that is broader in its applicability and includes an array of services and different network components may more effectively detect and pinpoint a variety of network problems. Further, a more stable analysis than a KL divergence is described that may improve the accuracy of network error detection. In addition, an anomaly detection module may determine not only failure but also other troubled behavior of network components; clustering anomalies may allow a multi-factor analysis of the root causes of network problems, and identify those that are the cause of the service degradations that affect the most users, allowing network administrators to prioritize repairs.

Referring now to the drawings, in which like numerals refer to like components or steps, there are disclosed broad aspects of various exemplary embodiments.

Figure 1:
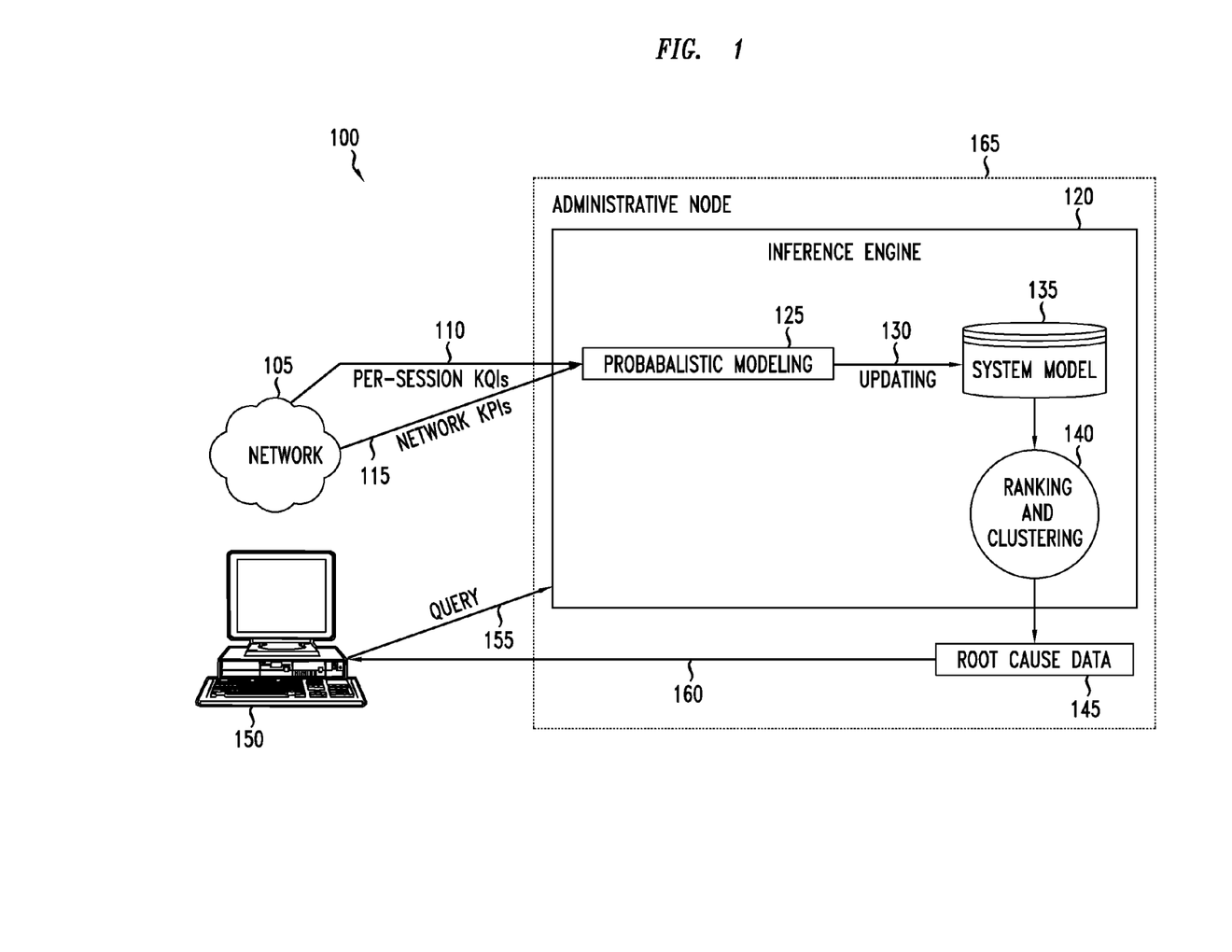
FIG. 1 illustrates an exemplary system for inferring the root causes of service degradation in a system.

FIG. 1 illustrates an exemplary system 100 for inferring the root causes of network issues. A system which may include a network 105 may include a number of components such as network elements and devices which may sampled for Key Performance Indicators (KPIs) and for Key Quality Indicators (KQIs), which may differ depending on the type of network or system. In a telecommunications network, for example, KPIs may include metrics such as, for example, buffer size load, device power consumption, CPU, memory, hard disk utilization, interface utilization, packet drop rate, buffer occupancy, counters, call success rate, channel congestion, call drop rate, data packet loss rate, call setup time, and handover success rate. KQIs may include, for example, data rates, voice call quality measures, average call failures per network node, throughput, web page response time, latency, packet loss rate, jitter, voice MOS, call accessibility, call retainability, mobility, and data throughput. KQIs for user connection sessions and network KPIs may be collected from the components of network 105 and sent 110, 115 to an inference engine 120 for processing. Key Quality Indicators may be measured on a network level, on a device level, or in some cases on a device or system component level, such that each KQI be at least associated with a particular device or group of devices.

Note that while real-time alarms and knowledge of network topology are not necessary for accurate determination of root causes, and thus successful determinations of root causes is not conditional on knowing network topology or receiving real-time alarms, where they are implemented they may be used as additional data to supplement other KPIs and KQIs, which in turn may improve accuracy of the modelling output described below, for instance by enhancing the ranking output by the model. For example, in the case of real-time alarms, there may be a statistical threshold of other performance indicators where the model below may determine that there is a problem. However, the accuracy of this statistical threshold is limited as will be discussed; if there is in addition a human-designed real-time alarm that is based on domain knowledge it may be ranked highly as a potential root-cause, without waiting for the data required for accurate statistics as discussed below.

Inference engine 120 may reside on an administrative node 165. The inference engine 120 may include a probabilistic modeling component 125 which computes a correlation score between a KQI degradation and various KPI degradations as described below, and that stores and updates 130 the results in a probabilistic model component 135, and a ranking and clustering component 140 that may rank KPIs according to their correlation score and may aggregate KQIs of one or more devices based on similar root causes to be stored in a root cause data store 145. A user may use an interface 150 to query 155 the interference engine 120 to return 160 the root causes 145 of certain KQI degradations.

The components of inference engine 120 may continuously process KPIs and KQIs to determine confluence between them, periodically updating the model 135. Note that although the algorithm of the inference engine 120 is described above, the method described below may be implemented independent of any particular architecture or structure.

Measurements of KQIs and KPIs may be taken over time and fed 110, 115 into the statistical inference engine 120. The inference engine 120 may statistically model 125 the root causes for each KQI, and may cluster and/or aggregate, and rank 140 the root causes of several KQIs to group services that may be affected by the same root cause. The statistical model 125 may score root causes initially by using anomaly detection and Bayesian inference on historical data, for example, by comparing the conditional probabilities that when a KQI is abnormal a KPI is abnormal and that when a KQI is normal a KPI is abnormal, which may be expressed as the formula Pr(KPI abnormal|KQI abnormal), and Pr(KPI abnormal|KQI normal). In other words, if there is a calculated probability that a KPI and a KQI are both abnormal, and the probability that the KPI is abnormal and the KQI is normal is much less, then it is more likely that the KPI being abnormal is the root cause of the KQI being abnormal. If Pr(KPI abnormal|KQI abnormal) goes to 1, and Pr(KPI abnormal|KQI normal) goes to 0, meaning they are behaving differently than each other (in opposite or near-opposite directions), then it is highly likely that this KPI is the root cause of changes to a KQI. Such a comparison will result in a score reflecting the difference between the two probabilities, where a significant difference indicates that the KPI is the root cause. Thus, for each KQI a vector containing the scores for each KPI as a root cause may be derived. The vector may be ranked such that for all of the scores of the probability that an abnormality in each KPI may cause abnormality in the given KQI, the most likely causes of abnormality in the KQI are identified.

Note that there are a number of different methods to determine whether a given metric is normal or abnormal. In one example, a baseline for normal behavior may be established by measuring metrics over time and establishing averages and outliers. For example, a baseline may be chosen when there were no reports of system outages, or by a user. Further, designated system alarms triggered by network protocols may also indicate abnormal behavior, and the lack of such events may indicate normal behavior. However, other methods of establishing normal and abnormal behaviors may be known in the art.

The inference engine 120 may further cluster 140 degraded KQIs based on their similar root cause vectors. The KPI score vector for every KQI, as described above, may be processed to determine a cluster assignment or assignments that may be based on the degree of similarity between each KQIs root cause scores. Each cluster may be modeled by a representative root cause vector that may be derived from the ranking of all the vector members in that cluster. KQIs whose vectors demonstrate a similar profile (such that they show similar probability scores for similar KPIs) may be clustered together. The average of all of the vectors in the cluster may be used to determine a representative KPI ranking that may indicate what the top leading KPI root causes for a type of KQI degradation within the cluster. Other operations may also be used to determine a representative root cause vector of a cluster.

The clusters may indicate which KPIs affect the most KQIs; thus, the degradation of one or more key KPIs that may affect a large population of devices may be pinpointed, which may alleviate the complexity of resolving each KQI degradation separately. Note that individual user devices or network components will each report KQIs; and a cluster of KQIs may indicate that one or more KPIs are the top root cause(s) of degradation in their performance. For example, if there are a lot of user reports of service failure in a large population center, the KPI that is the most impactful may be pinpointed to identify failed equipment. Likewise, if KPIs for devices in the cluster indicate a vector profile similar to that of a representative vector, the KQIs for those devices may be more actively monitored for any abnormality.

Figure 2:
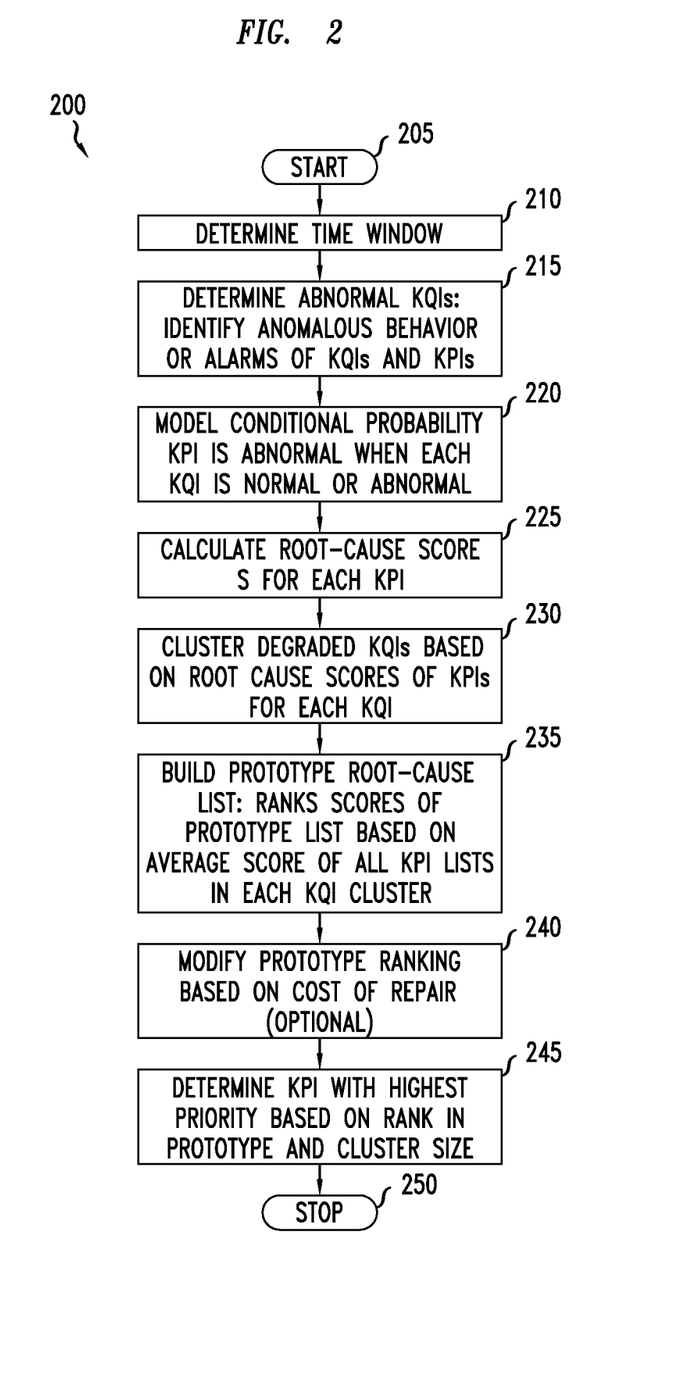
FIG. 2 illustrates an exemplary method of creating a probabilistic statistical model for determining the root cause of service degradation.

In one embodiment of the statistical modeling component 125 of the inference engine 120, past values of KPIs and KQIs may be analyzed to create a probabilistic model for each KQI degradation root-cause. Specifically, all the events in which a KPI was abnormal may be determined, and for a fixed-sized window of history, the conditional behavior of the KPI and KQI may be compared. Note that if a window was used to establish a baseline for normal and abnormal behavior of KQIs and KPIs, a different window may be chosen to establish a baseline for anomaly detection than that of the history observed to establish the probability of anomalous behavior occurrences (in order to establish a confluence of KQI and KPI abnormality). Given an established baseline of normal KPI and KQI values, there will be a distribution of each value that may be considered "normal"—new readings that reside in the tail ends of the distribution may be considered anomalous. Other anomaly detection methods may also be used to determine anomalous behavior FIG. 2 illustrates an exemplary method 200 of creating a probabilistic statistical model for each KQI degradation root-cause. In one embodiment of the invention, the method will begin 205 and a time window may be chosen 210. The size of the window may be determined based upon the historical data itself such that there may be a spectrum of window sizes that may be used based on the actual recorded behavior of the KPIs and KQIs. Determining the window size will be discussed further below with regards to computing a Beta conditional distribution of the recorded KQIs and KPIs. The size of the window will be the limit of the amount of KQI and KPI history to be considered.

Next, the method may determine when each KQI is abnormal 215 (relative to the determination of a baseline as discussed above) by identifying the anomalies and/or the integrated network alarms in the time window.

Next, the conditional probability that each KPI is abnormal when the state of the KQI is normal or abnormal may be calculated 220, such that if the probability that the KPI is abnormal when the KQI is abnormal approaches 1 (e.g. every time that the KQI is abnormal, the KPI was also abnormal), and the probability that when the KQI was normal the KPI was NEVER abnormal approaches 0 (e.g. it almost never happens that this KPI is abnormal when this KQI is normal), then the given KPI may be determined as highly correlated with the given KQI. Thus, when the KQI is abnormal, it is most likely that the KPI is abnormal too. This may be expressed as:

$$Pr(\text{KPI abnormal}|\text{KQI abnormal})=Pr(Pa|Qa)=1-Pr(Pn|Qa),$$

$$Pr(\text{KPI abnormal}|\text{KQI normal})=Pr(Pa|Qn)=1-Pr(Pn|Qn),$$

Where KPI is more likely related to KQI as $Pr(Pa|Qa) \rightarrow 1$ and $Pr(Pa|Qn) \rightarrow 0$.

Modeling the probabilities that a KPI is abnormal when the state of the KQI will be normal or abnormal 220, may include modeling the conditional KPI states as a random variable such as a Bernoulli trial with unknown probability of success p, i.e. the conditional probability of a KPI being abnormal if a given KQI is abnormal. The result of a Bernoulli trial is binary—each metric may be normal or abnormal. Thus, conditional probability generated by the Bernoulli model derives from an anomaly detection process that determines when a KPI is abnormal or normal. Thus, KPIs and KQIs may be transformed from continuous metrics having quantitative values to a pass-fail test (Bernoulli trial random variables) of being normal or abnormal. In the Bernoulli test, success may be an Abnormal value, and failure may be a normal value.

The probabilities of the above equations have a posterior distribution which may result from the calculation of the conditional probability 220. The posterior distribution may capture the uncertainty attributed to the calculation. The Bayes theorem may be used to combine the prior distribution with the observed events to obtain the conditional probability distribution for the unobserved quantities of interest given the data, resulting in the posterior distribution. The prior distribution expresses the degree of understanding (or lack thereof) before seeing the data. The posterior distribution expresses the understanding or the gain in knowledge after seeing the data.

The posterior distribution of p after $\alpha-1$ successes (with probability of success p) and $\beta-1$ failures may be expressed as $\text{Beta}(\alpha,\beta)$. Where the total number of historical observations $n=\alpha+\beta-2$, the distribution mean will be $\alpha/(\alpha+\beta)$. As the number of observations n grows, the distribution will exhibit less variation, in other words, less uncertainty.

As such, the size of the time window chosen as described above will be important, because the larger the window, the more observations, and potentially greater accuracy. However, a window that is larger than necessary will lead to inefficient and inaccurate processing as follows. The ideal size of the historical window may be of a size that contains at least $\alpha-1$ success and at least $\beta-1$ failures for that KPI. As described above, $\alpha$ and $\beta$ are parameters for computing the Beta distribution for an event such as KPI=abnormal when KQI=normal. The model may be updated periodically as new data is recorded (and as the network or system components and settings may change over time); thus, in addition, the window may be bounded from above by setting a counter for the number of hypothesis testing that fail as new events are added into the historical data and thus into the current distribution, after $2*(\alpha-1)$ and $2*(\beta-1)$ successes and failures have been observed.

For example, if no abnormality of a certain KPI has ever been observed, there is a question of uncertainty of whether this KPI is causing degradation of a given KQI. There is a minimum and optimal amount of history that may be observed to make the determination of the KPI being the root cause with a high degree of certainty. A mechanism for determining the degree of certainty provided by the KQIs and KPIs in the record is built into the probabilities of the inference engine—the Beta distribution takes into account the window size, taking into account in the probability what the certainty is in the window of history that has been observed so far. The window may be of a size such that a certain amount of successes/failures are shown to be abnormal/normal so that a distribution may be built; if there are no such events, it may not be possible to create a reliable empirical distribution of behavior that can be described as normal or abnormal. However, due to network or system changes over time, events in the relatively far past may not accurately reflect probabilities of a given KPI representing the root cause of KQI degradation, but rather may introduce noise into the calculation in the form of inaccuracy. Thus, the window may be of a minimal size, but not so large that events are included that may introduce inaccuracy.

Figure 3:
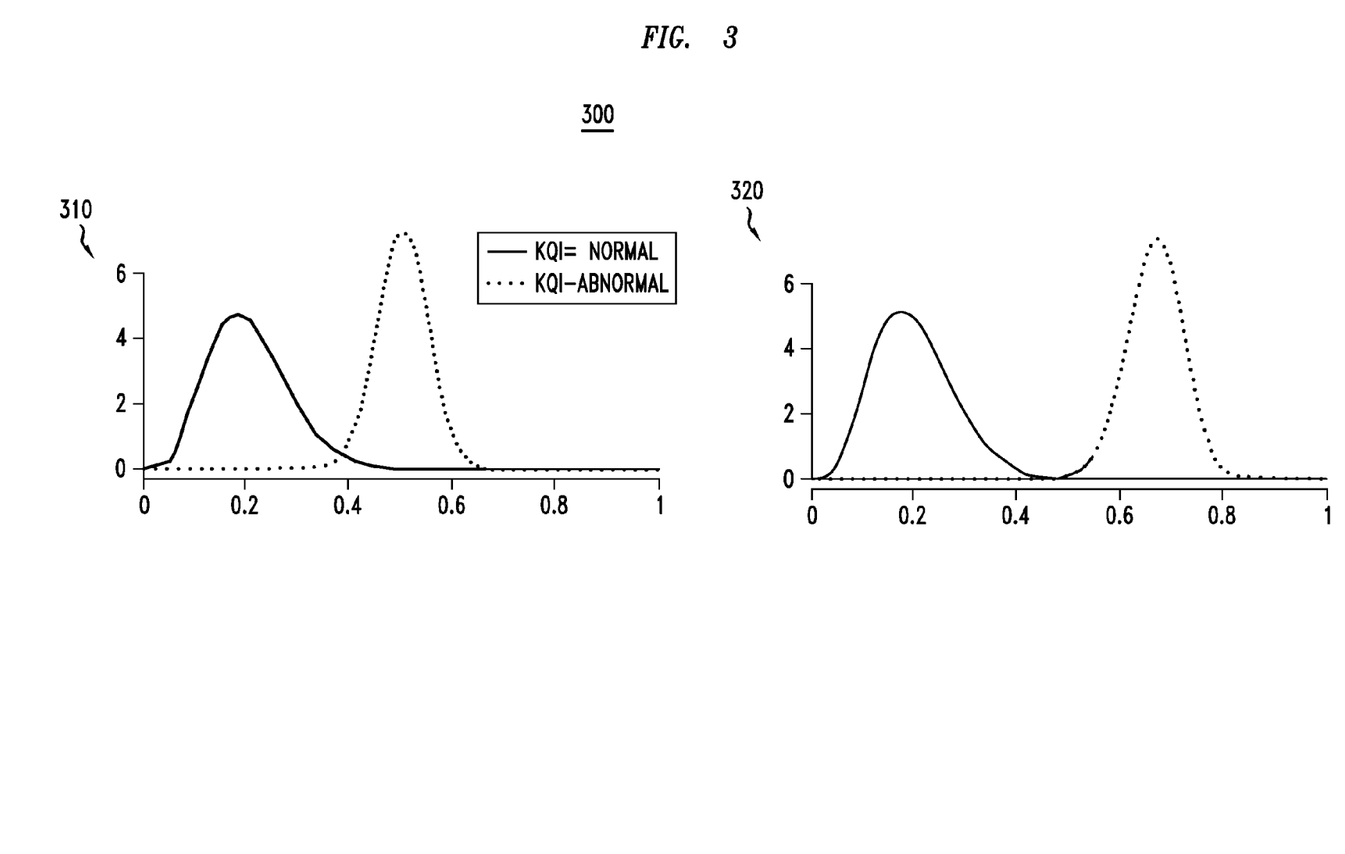
FIG. 3 illustrates exemplary posterior distributions for observations of different KPIs and KQIs.

FIG. 3 illustrates exemplary Beta distributions 300 for observations of different KPIs and KQIs as graphs 310 and 320. The Beta distribution models the posterior distribution for the success of $Pr(Pa|Qa)$ and $Pr(Pa|Qn)$ after $2*(\alpha-1)$ and $2*(\beta-1)$ successes and failures have been observed, for example, as illustrated by graphs 310 and 320, may be measured 220 to determine the relationship between each KPI and KQI, where the more the distributions overlap, for example as in graph 310 the more dissimilar the KPI behavior is to the KQI behavior. Further, as the number of observations n grows, the distributions take on narrower shapes, and the confidence in the estimation increases. An exemplary increased confidence is captured in graph 320, illustrating similar KPI abnormal behavior when KQI is normal and abnormal. Thus, strong dissimilarity, or divergence, between Beta distributions as shown in graph 320 implies correlation of KPI behavior with KQI behavior, and stronger confidence. Put another way, because abnormal KPIs and both normal and abnormal KQIs are observed to determine $Pr(Pa|Qa)$ and $Pr(Pa|Qn)$, one distribution as shown in each of graphs 310 and 320 is conditional on a KQI being normal, and one is conditional on a KQI being abnormal—the more the distributions overlap, the less likely it is that a KPI is causing the behavior of the KQI, and the less they overlap, i.e. are divergent, the more likely it is that a KPI is causing the behavior of the KQI.

A Jensen-Shannon (JS) divergence may be used in combination with a Kullback Leibler (KT) divergence to measure the divergence between the two Beta distributions for $(Pa|Qa)$ and $(Pa|Qn)$ 225 as follows. A KT, divergence of two distributions P1 and P2 may be defined as $$KL(P1\|P2) = \int_{-\infty}^{\infty} P1(x) \ln \frac{P1(x)}{P2(x)} dx.$$

However, the function may become undefined when the distributions are non-overlapping as in graph 320, because the function is defined only if $P2(x)>0$ for all x so that $P1(x)>0$. Because there is a risk that sometimes P2 may be 0, and the divisor may become 0.

To avoid this instability in the KT, divergence, a JS divergence may be used which combines two KL divergences of P1 and P2 ($KL(P2\|P)$ and $KL(P1\|P)$), where P is the average of P1 and P2 which will be 0 only if both P1 and P2 are 0, thus eliminating the instability of the KL divergence of P1 and P2 alone. The average of P1 and P2, P, may be expressed as P=0.5(P1+P2), and a Jenson Shannon divergence of P1 and P2 may be expressed as JS(P1∥P2)=½(KL(P1∥P)+KL(P1∥P)). Therefore, although a KL divergence alone may be unstable due to the risk of a P2(x)=0 rendering the equation unsolvable, this may be overcome when a JS divergence is used. However, the architecture described herein is agnostic of the model, thus rather than using a JS divergence a different model may be used. Likewise, different methods of anomaly detection may be used.

A score may be assigned to each KPI 225 depending upon how dissimilar its abnormal behavior is when a given KQI is normal or abnormal. If KPI is a root-cause for an abnormal KQI reading, it may be expected that the sample mean M_aa of Beta for (Pa|Qa) should be high, the sample mean M_an of Beta for (Pa|Qn) should be low, and a JS-divergence between these two Beta distributions should be large. An equation for the root-cause score S of a KPI may be expressed as S=JS(A∥N)*(M_aa−M_an)/ln(2), where the score S will be negative if M_aa<M_an, i.e. the KPI is abnormal more frequently when the KQI is behaving normally. Further, note that for simpler interpretation the equation for S above is normalized to be between 0 and 1 by dividing by ln(2). The maximum of JS(A∥N) is bounded above by ln(2); thus when JS(A∥N)*(M_aa−M_an) is divided by ln(2) the result is a normalized JS to be a maximum of 1. Also note the two means, M_aa and M_an, are also bounded by 0 and 1, thus by scaling S to get the scores between 0 and 1, where JS is bounded between 0 and ln(2), and M_aa and M_an are bounded between 0 and 1, for convenience of comparing the divergence of KQIs and KPIs the score may be scaled between 0 and 1, by dividing by ln(2).

Once the root cause score S of each KPI has been calculated 225, KQIs with similar root-cause lists may be clustered 230; by clustering KQIs with similar KPI scores, when many KQIs are degraded, root cause detection and recovery prioritization may be more accurately focused by clustering KQIs with similar causes.

The similar KQI vectors may be merged such that a representative KQI score ranking list may be generated for each KQI as follows. An average score for each KPI of all of the KQIs in each cluster may be determined to generate a prototype root-cause list 235. The scores for each prototype may be ranked 235 and if necessary the scores may be grouped 250 to infer that KPIs alone or in combination may be the source of any abnormal KQI. For example, where no single KPI may be determined 245 to be the root cause of an abnormal KQI because the certainty is insufficient for that KPI to be the cause, when two or more high-scoring KPIs are grouped the certainty may become sufficient to determine that when both KPIs are abnormal they are likely the cause of an abnormal KQI. Note that the scoring function will be insensitive to the number of KPIs used, because low-scoring KPIs will become background noise—when compared to higher scoring KPIs. Put another way, KPIs for a KQI may be combined in rank order until a correlation is found, and further KPIs disregarded because they show to have relatively little impact on the overall behavior of the given KQI. Thus, even where KQI behavior is dependent on the behavior of multiple KPIs, the root-cause of KQI abnormality may be determined.

In some embodiments, after the prototype root-cause list has been generated for each cluster and the KPIs ranked by score, the ranking may be modified based on repair costs for each KPI or KPI group 240. In such an embodiment, each KPI may be assigned a cost for repair by a network administrator or other user; if multiple KPIs are indicated to be a root cause, the costs of each may be added to become a total cost. Lower cost KPIs or root causes (e.g. grouped KPIs) that are close in score and/or rank than KPIs or root causes that cost more may be promoted in rank; for example, two KPIs or grouped KPIs with identical scores may be ranked based on cost. In some embodiments, in order to maximize the impact of recovery actions, the size of each cluster may be measured so that root-cause recovery for clusters containing many degraded KQIs may be prioritized.

Once the ranking has been determined in step 235 and/or 240, the KPIs with the highest priority may be determined based on rank 245. In some embodiments, grouped KPIs may be separated back into individual KPIs and ranked based on cost. Once the KPIs with the highest priorities are determined, the method may stop 250. One of skill in the art may understand that the method may repeat periodically or as sufficient KPI and KQI data to improve the model is received from each component.

As has been shown, modelling a statistical comparison between KPI and KQI values based on separation and divergence of conditional probability distributions captures abnormalities in KPIs which may be associated with abnormalities in KQIs and automatically integrates any uncertainty due to low sample sizes. This model obviates the need for resource-intensive topology mapping and network domain information gathering, because it automatically and accurately determines the root causes of KQI abnormalities based upon historical data.

Figure 4:
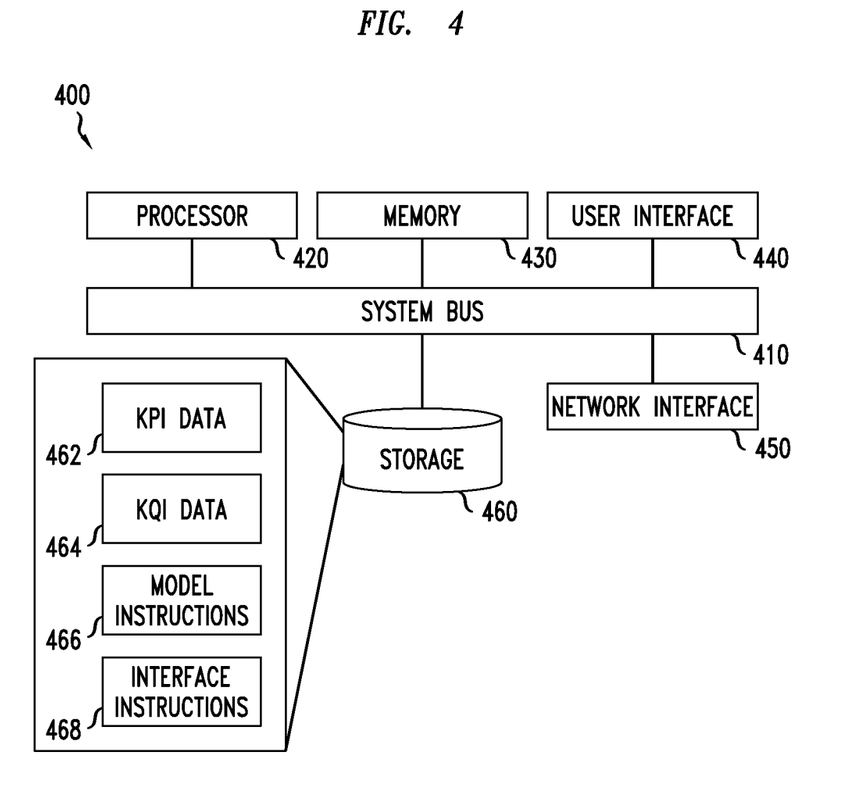
FIG. 4 illustrates an exemplary hardware diagram for a device including a system to determine root causes of service degradation.

FIG. 4 illustrates an exemplary hardware diagram for a device 400 such as device including a system to determine root causes of service degradation. The exemplary device 400 may correspond to Inference Engine 120 of FIG. 1. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460. As such, the processor may include a microprocessor, field programmable gate array (FPGA), application-specific integrated circuit (ASIC), or other similar devices.

The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a mouse, and a keyboard for receiving user commands.

The network interface 450 may include one or more devices for enabling communication with other hardware devices. For example, the network interface 450 may include a network interface card (NIC) configured to communicate according to the Ethernet protocol. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store Model instructions 466 for determining the root causes of service degradation and Interface instructions 468 to allow a user to query system 400 according to the concepts described herein. The storage may also store KPI Data 462 and KQI Data 464 for use by the processor executing the Model instructions 466.

According to the foregoing, various exemplary embodiments provide for determining the root causes of service degradation. In particular, by modelling which Key Performance Indicators are the cause of abnormality in Key Quality Indicators for each system component or group of components.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of determining the root cause of service degradation in a network, the method comprising:
   determining a window of time;
   determining one or more abnormal Key Quality Indicators (KQIs) in the window;
   determining one or more abnormal Key Performance Indicators (KPIs) in the window;
   calculating a conditional probability that each of one or more KPIs is abnormal when a Key Quality Indicator (KQI) is normal;
   calculating a conditional probability that the each of one or more KPIs is abnormal when the KQI is abnormal;
   calculating a score for each KPI based upon a divergence of
      a Beta distribution for the conditional probability that each of one or more KPIs is abnormal when a KQI is normal, and
      a Beta distribution for the conditional probability that the each of one or more KPIs is abnormal when the KQI is abnormal; and
   generating a representative root-cause list based upon the score for each KPI.

2. The method of claim 1, wherein the step of determining one or more abnormal KQIs in the window comprises determining anomalous behavior of the KQI.

3. The method of claim 1, wherein the step of determining one or more abnormal KQIs in the window comprises determining network alarms of the KQI and determining network alarms of the KPI.

4. The method of claim 1, further comprising generating two or more clusters of KQIs based on root cause scores of the KPIs of each KQI, wherein each cluster comprises at least one KQI.

5. The method of claim 4, wherein the step of generating a representative root-cause list based upon the score for each KPI comprises calculating a weighted average score of each KPI type in each cluster.

6. The method of claim 5, wherein the step of generating a representative root-cause list based upon the score for each KPI comprises ranking the scores for each of the one or more KPIs.

7. The method of claim 4, further comprising:
   determining the size of each cluster; and
   prioritizing two or more root cause recovery actions based on the size of each cluster.

8. The method of claim 1, wherein the step of generating a representative root-cause list based upon the score for each KPI comprises ranking the scores for each of the one or more KPIs.

9. The method of claim 8, further comprising modifying the rank of the scores for each of the one or more KPIs based upon a cost to repair each of the one or more KPIs.

10. The method of claim 1, further comprising determining a KPI with the highest priority.

11. The method of claim 10, wherein determining a KPI with the highest priority comprises determining the KPI with the highest rank, impact and lowest repair costs.

12. The method of claim 10, wherein determining a KPI with the highest priority further comprises:
    determining the size of each cluster of KQIs; and
    prioritizing two or more recovery actions based upon the number of KQIs
    determined in the size of each cluster of KQIs.

13. An administrative device for determining the root cause of service degradation in a network, the device comprising:
    a network interface configured to communicate with other devices in a network;
    a memory; and
    a processor in communication with the network interface and the memory, the processor configured to:
    determine a window of time;
    determine one or more abnormal Key Quality Indicators (KQIs) in the window;
    determine one or more abnormal Key Performance Indicators (KPIs) in the window;
    calculate a conditional probability that each of one or more KPIs is abnormal when a Key Quality Indicator (KQI) is normal;
    calculate a conditional probability that the each of one or more KPIs is abnormal when the KQI is abnormal;
    calculate a score for each KPI based upon a divergence of
       a Beta distribution for the conditional probability that each of one or more KPIs is abnormal when a KQI is normal, and
       a Beta distribution for the conditional probability that the each of one or more KPIs is abnormal when the KQI is abnormal; and
    generate a representative root-cause list based upon the score for each KPI.

14. The administrative device of claim 13, the processor further configured to, when determining one or more abnormal KQIs in the window, determine anomalous behavior of the KQI.

15. The administrative device of claim 13, the processor further configured to, when determining one or more abnormal KQIs in the window,
 determine network alarms of the KQI; and
 determine network alarms of the KPI.

16. The administrative device of claim 13, the processor further configured to generate two or more clusters of KQIs based on root cause scores of the KPIs of each KQI, wherein each cluster comprises at least one KQI.

17. The administrative device of claim 16, the processor further configured to, when generating a representative root-cause list based upon the score for each KPI, calculate a weighted average score of each KPI type in each cluster.

18. The administrative device of claim 17, the processor further configured to, when generating a representative root-cause list based upon the score for each KPI, rank the scores for each of the one or more KPIs.

19. The administrative device of claim 16, the processor further configured to:
 determine the size of each cluster; and
 prioritize two or more root cause recovery actions based on the size of each cluster.

20. The administrative device of claim 13, the processor further configured to, when generating a representative root-cause list based upon the score for each KPI, rank the scores for each of the one or more KPIs.

\* \* \* \* \*